Feb. 25, 1958  B. CAMETTI ET AL  2,824,983
ELECTRIC MOTOR COOLING

Filed Nov. 2, 1954  2 Sheets-Sheet 1

INVENTOR
Benjamin Cametti &
William M. Wepfer.
BY
Arthur J. Stratton
ATTORNEY

United States Patent Office 2,824,983
Patented Feb. 25, 1958

2,824,983

ELECTRIC MOTOR COOLING

Benjamin Cametti, Forest Hills, and William M. Wepfer, Pittsburgh, Pa., assignors to Westinghouse Electric Corporation, East Pittsburgh, Pa., a corporation of Pennsylvania Application November 2, 1954, Serial No. 466,247

12 Claims. (Cl. 310—64)

Our invention relates generally to electric motors, and more particularly to an arrangement for cooling the end turns of motor stator windings.

In all electrical rotating machinery there exists losses which, by the nature of the design and also because of the basic behavior of the materials used, are inherent in such machinery and cannot be eliminated. In almost all instances these losses appear in a final form as heat energy which must eventually be removed at some specific rate or otherwise permanent damage to the machine will result from overheating. The problem of removing this heat energy from sealed motor pump units is particularly difficult because of the design of such units. Sealed motor pump units are used to pump dangerous and explosive fluids in systems having a substantially zero leakage allowance and are designed to operate with the rotating element of the motor completely submerged in the fluid being pumped. In order to prevent damage to the stator windings, a barrier is provided which isolates the stator winding from the fluid in which the rotating element is submerged. The barrier used in isolating the stator windings is usually sealed to the motor frame so as to enclose the stator in the motor frame. In so enclosing the stator, the problem of cooling it arises since it is no longer open to the atmosphere as is the case of ordinary motors and thus must depend on some other means than air circulated through the motor for cooling. While a substantial part of the heat generated in the portions of the stator windings located in slots in the stator core can be conducted through the core to the motor casing, the heat generated in the stator end turn windings is not as readily disposed of.

In order to cool the stator windings in such sealed motor pump units, it has been proposed in the past to circulate a dielectric fluid around the stator windings to remove the heat. The dielectric fluid after absorbing heat from the stator windings is circulated through an external heat exchanger where it is cooled prior to its re-entering the motor. This method of cooling the stator winding has a number of disadvantages, such as: it requires auxiliary equipment to circulate and cool the fluid; fluid having the desirable combination of good dielectric strength, high specific heat, high thermal flash point is required; in the event the fluid absorbs moisture an electrical breakdown of the motor may occur; and in the event the barrier which isolates the stator winding from the fluid in which the rotor is operating should rupture the fluid will intermix with the fluid being pumped and this may result in serious damage to the machinery.

We have eliminated these disadvantages with our cooling arrangement since it does not require the circulation of a special dielectric fluid through the stator winding nor an external heat exchanger. Our arrangement is completely self-contained within the stator assembly and requires no moving parts or external connections, thus it is simple to manufacture, low in cost and easy to maintain.

It is accordingly the principal object of our invention to provide a novel motor construction for improved cooling of the end turns of the stator windings thereof.

Another object of our invention is to provide a novel motor construction having a substantially all metal path for the transfer of heat from the end turns of the stator windings thereof to the surrounding atmosphere or to an external cooling jacket surrounding the motor frame.

Another object of our invention is to provide a novel end turn cooling construction for the stator windings of rotating electrical equipment, which requires no external cooling medium, and can be used in sealed motor pump units.

These and other objects and advantages of our invention will be more apparent from the following detailed description in which.

Our end turn cooling construction consists generally of fin-like members which are sandwiched between the adjacent end turns and are provided with metal-to-metal contact with the motor frame by means of a metallic banding member and a securing ring. Each fin-like member is separated from contact with the end turns by suitable insulation, but good heat transfer is maintained by having the insulation in intimate contact with the end turn on one side and the fin member on the other. After the heat is transferred to the fin-like member, it has an all metal path through which it may flow to the motor frame where it can be easily dissipated by any desired means.

Figure 3:
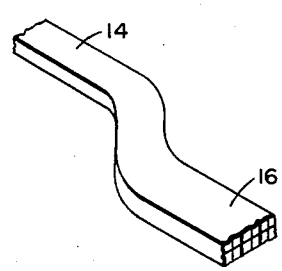
Fig. 3 is an enlarged partial view of one stator winding conductor showing the enlarged cross section of the end turn.

In the illustrative embodiment of our invention shown in the drawings a tubular motor frame 10 has annular end plates 11 attached at each end by any suitable means, such as welding 13. Positioned on the inner surface of the motor frame 10 is a suitable stator assembly consisting of stacked laminations 12 of suitable magnetic material, such as silicon steel which have inwardly opening slots 15 for receiving a pair of pre-formed stator windings 14, each of which is comprised of three rectangular shaped conductors preferably of a good electrical conducting material, such as copper. Each stator winding 14 is insulated from the adjacent winding and terminates in an end turn 16, pairs of which are joined by means of overlapping knuckle connections 17. The stator windings 14 are increased in cross section where they form end turns 16 by reducing that portion of the winding which is placed in the slot in both thickness and width as shown in Fig. 3. By increasing the cross section of the end turns 16 the rate of heat transfer from the end turns to our cooling device is increased and also the current density in the end turns is decreased when the stator is energized thereby reducing the heat generated in the end turns. We prefer to provide our end turns 16 with approximately seventy percent more cross-sectional area than the portion of the stator windings 14 that are placed in the slots in the stator laminations. The stator assembly is isolated from the fluid in which the rotating element of the motor is operating by means of a thin tubular sleeve 20 preferably of a corrosion resisting material, such as stainless steel. Tubular sleeve 20 is positioned on the inner surface of the stator laminations and is provided with a suitable backing ring 18 adjacent each end of the stacked stator laminations so that it may withstand extremely high pressures where it is unsupported by the stacked stator laminations. The tubular sleeve 20 is hermetically sealed at each end of the stator assembly to the backing rings 18 by any suitable means, such as a small weld 22. Each backing ring 18 is attached at one end to the motor frame 10 by any suitable means, such as a weld 21, and is supported at the other end adjacent the stator laminations 12 by an annular member 19 which has inwardly opening slots corresponding to the slots in the stator laminations 12 so that the stator windings may pass through them.

Figure 1:
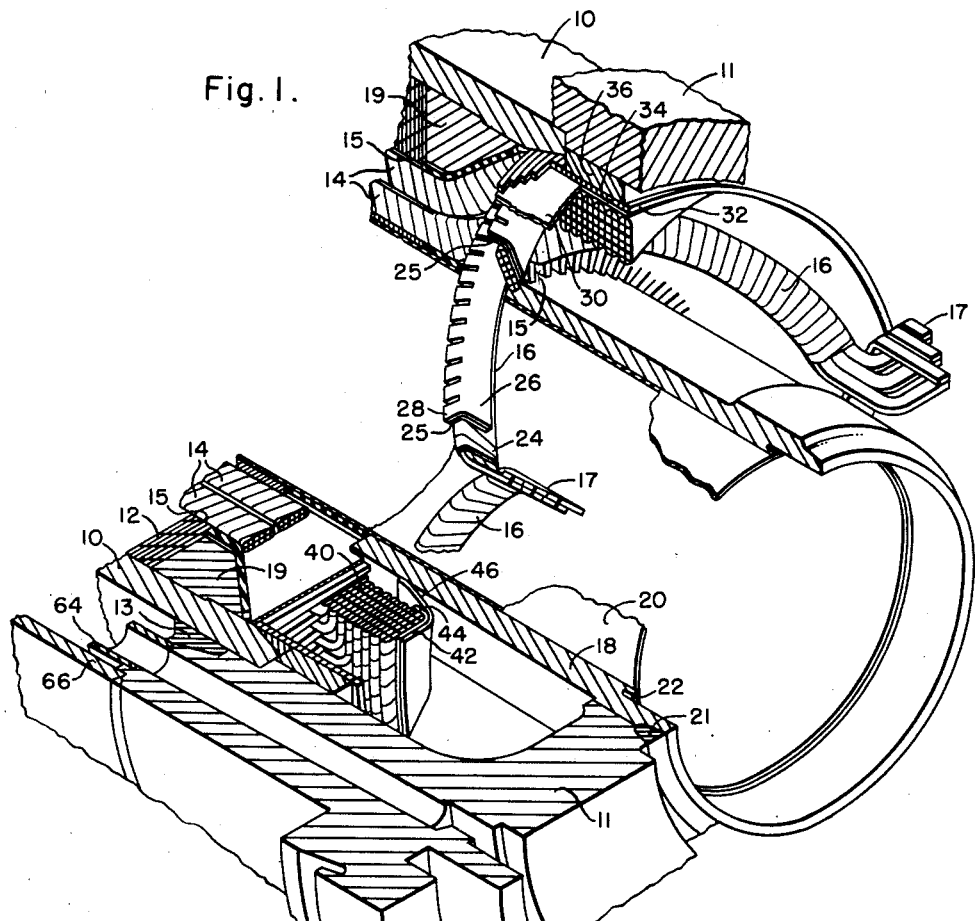
Figure 1 is an isometric view shown partly in section showing our end turn cooling construction at one end of a motor stator assembly.

Each stator winding consisting of three rectangular shaped conductors is provided with a wrapped insulation 24 preferably of an insulating material, such as mica tape, which serves to insulate the stator windings from the stator laminations 12 and the end turns 16 from each other. Sandwiched between adjacent end turns 16 are fin members 26 preferably of a good heat conducting material, such as copper. While the wrapped insulation 24 will insulate the fin members 26 from the end turns 16 we prefer to use an additional angle shaped strip of insulation 25, preferably of a good insulating material, such as mica between the end turns and the fins in order to insure against grounds in the stator windings caused by the fins 26 coming in contact with the end turns 16. The fin members 26 have small rectangular-shaped tabs 28 projecting outwardly along their outer periphery. After all of the stator windings have been placed in the slots in the stator laminations and all end turns connected, the tabs 28 are bent at right angles to the main body of the fin members 26, as shown in Fig. 1. After the tabs are bent at right angles, a foil wrapping 30, preferably of a good heat conducting material, such as copper, is wrapped tightly around the outer surface of the stator end turns and the bent-over tabs 28 of the fins 26. The foil wrapping 30 serves to hold the fin members 26 securely in place between the end turns 16 and in addition is in intimate contact with the bent tabs 28. The foil wrapping 30 is held in place by a tightly wound wire banding 32 also preferably of a good heat conducting material, such as copper. The wire banding 32 is held in place and adjacent wires of the banding are secured to each other by any suitable means, such as flowing molten solder over the outer surface of the banding. The outer banding 32 is then machined on its outer surface to an outwardly tapered shape 34, as shown in Fig. 2.

Figure 2:
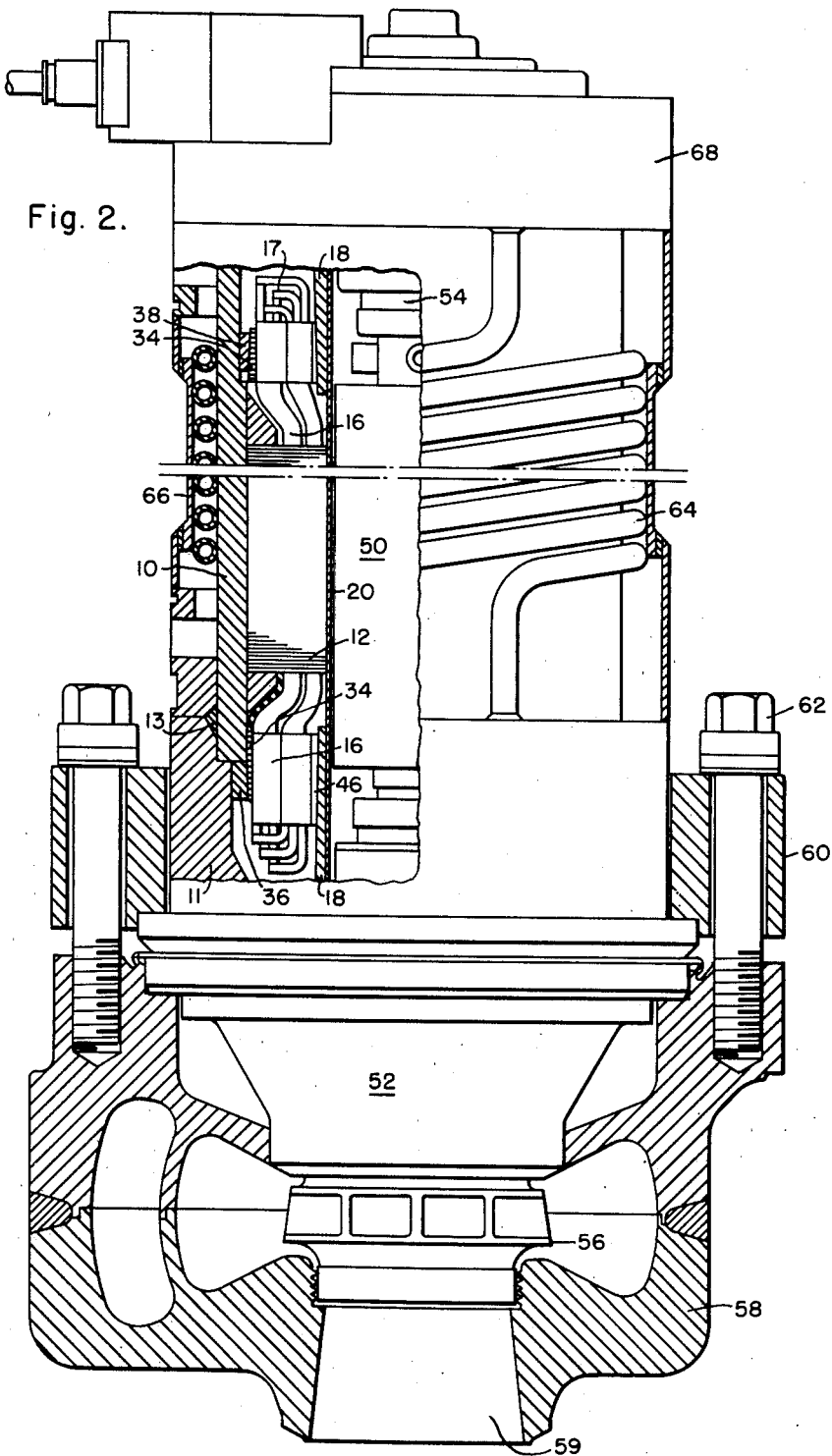
Fig. 2 is a longitudinal section of a sealed motor pumping unit having the end turn cooling construction shown in Fig. 1 at each end of the stator assembly.

In Fig. 2, our end turn cooling arrangement is shown installed at opposite ends of a stator assembly. After the stator assembly, including the end turn cooling arrangement described above, is positioned in the proper location in the motor frame 10, retaining rings 36 and 38 are forced into position on the outer surface of the banding 32 of the upper and lower end turn cooling apparatus, respectively. The retaining rings 36 and 38 are preferably of a good heat conducting material, such as copper, and are tapered on their inner surface in the opposite direction to the tapered outer surface 34 of the banding member 32. Thus when the retaining rings 36 and 38 are forced into position, their inner and outer surfaces will be in intimate contact with the banding member 32 and the motor frame 10, respectively, and complete the path of low resistance for the transfer of heat from the end turns to the motor frame. It may be desirable in some cases for ease of assembly to first place the lower retaining ring 36 in the position in the motor frame 10 and then lower the stator assembly into position from the upper end of the motor frame. In this case, the stator assembly would be forced into position against the lower ring 36 and then the upper ring 38 installed as described above.

As can be seen from the above description, we have provided an end turn cooling construction wherein parts are permanently mounted on the end turns and are easily installed in end turns of a stator assembly when the stator assembly is being manufactured, and will not project beyond the outer surface of the stator laminations 12. Thus our end turn cooling construction will not interfere with the positioning of the stator assembly in the motor frame 10. Our construction is very efficient in transferring heat from the end turns of the stator winding to the motor frame due to the path of low resistance provided for the flow of heat. The path of low resistance is substantially an all metal path except for the electrical insulation which surrounds the stator winding. The heat upon reaching the motor frame 10 can be easily removed by any well known method, such as radiation or circulating a cooling medium around the motor frame. Our end turn cooling construction, in addition, requires no moving parts and no cooling medium within the stator from an external source, thus it requires little maintenance and is not subject to failure in operation as are previous devices.

It will be noted that the cooling arrangement described above is directly associated only with the end turns of the windings 14 which are in the bottom of the stator slots 15. When it is desired to increase the rate of heat transfer from the stator end turns 16, we may also provide a second cooling arrangement similar to the arrangement described above for the stator windings, which are placed in the top or innermost part of the slots 15 in the stator laminations, as shown in Fig. 1. This cooling arrangement differs from that described above in that the foil wrapping 30, wire banding 32 and retaining ring 36 are omitted. The fins 42, preferably of a good heat conducting material having some resiliency such as a copper alloy, are sandwiched between adjacent end turns of the top stator windings, in the same manner as described for fins 26. An angle shaped strip of insulation 44, preferably of a good insulating material, such as mica, similar to strip 25 described above, is placed between the fin 42 and the adjacent end turn. The inwardly projecting tabs 46 on the fin 42 are not bent at right angles to the main body portion of the fin as in the case of fins 26 but are only slightly curved as shown in Fig. 1. We only provide sufficient curvature in the tabs 46 so that when the stator assembly is inserted into the motor frame the tabs 46 will be bent and thus stressed as shown in Fig. 1, into contact with the backing rings 18 at each end of the stator assembly. The natural resiliency of the fins 42 is used to retain them in contact with the backing ring 18.

The motor unit is provided with a rotor 50 having shaft extensions at each end which are rotatably mounted in suitable bearings 52 and 54 which, in turn, are mounted on the motor frame. The rotor 50 is designed to operate completely submerged in the fluid being pumped and the bearings 52 and 54 may be designed to be lubricated by the same fluid. Mounted on the lower end of the motor shaft is an impeller 56 which operates in a pump casing 58 and is hollow so as to draw fluid in through inlet opening 59 and impel it radially outward and through a suitable radial discharge opening in the casing 58 (not shown). The pump casing 58 and the motor are secured together to form one sealed unit by means of a suitable clamping ring 60 which engages a cooperating flange 64 on the motor end plate 11. Bolts 62 pass through the clamping ring 60 and thread into the casing 58 and serve to draw the motor and pump casing 58 into a sealed relationship. The stator windings 16 are isolated from the fluid which fills the rotor cavity by means of the thin walled tubular sleeve 20 previously described. As shown in Fig. 2, there may be provided a coiled heat exchanger 64 which surrounds the motor frame 10 and is in contact with the motor frame. The fluid being pumped may be circulated through the heat exchanger, by any suitable means (not shown) in order to remove the heat which is transferred by our end turn cooling device from the end turns to the motor frame 10. Surrounding the coiled heat exchanger 64 is a tubular outer casing 66 which is in contact with outer surface of the coiled heat exchanger 64 and is sealed at each end to the motor frame 10. The upper end of the motor unit is closed by means of a suitable cover 68. The above motor pump unit is more particularly described in our copending application entitled Motor Pump Unit, filed July 1, 1954, Serial No. 440,826, and assigned to the same assignee as this application.

We have shown our end turn cooling construction installed in a particular sealed motor pump unit, but it can, of course, be used in any rotating electrical machine where it is desired to remove heat from the stator assembly. Our end turn cooling construction would provide a path of low resistance for the flow of heat from the end turns of the stator winding to the motor frame in any application. Our end turn cooling construction is also capable of many modifications. For example, we have omitted the foil wrapping 30, wire banding 32 and retaining ring 36 of Fig. 1 and used modified fin members similar to fin members 42 in place of the fin members 26. When using modified fin members in place of fin members 26 we relied on the resiliency of the metal to maintain the projecting tabs in contact with the motor frame.

We claim as our invention:

1. An electric motor comprising, a hollow motor frame, a stator having a winding and a central rotor opening mounted in said motor frame, a rotor rotatably mounted in said motor frame, cooling means for the end turns of said stator windings, comprising metallic fins placed between adjacent end turns and electrically insulated therefrom, said fins having tabs projecting at right angles from the portion of said fin placed between adjacent end turns, a metallic foil surrounding said tabs, said foil being tightly banded on its outer surface by a wire member and a ring member of good heat conducting material positioned between said banding and said motor frame and in engagement with said banding and said motor frame.

2. An electric motor comprising, a hollow motor frame, a stator having a winding and a central rotor opening mounted in said motor frame, a rotor rotatably mounted in said motor frame; a cooling means for the end turns of said stator windings, comprising, metallic fins placed between adjacent end turns and insulated therefrom, tabs projecting from said fins, means including a banding member and a ring of good heat conducting material for holding said tabs in contact with said end turns and providing a path of low resistance for the transfer of heat from said tabs to the adjacent motor frame.

3. In an electric motor, a hollow motor frame having a stator assembly hermetically enclosed therein, a cooling means for the end turns of said stator assembly comprising, metallic fins placed between adjacent end turns and insulated therefrom, tabs projecting at right angles from the portion of said fin placed between adjacent end turns, a metallic foil surrounding said tabs, said foil being tightly banded on its outer surface by a wire member and a ring member of good heat conducting material placed between said banding and said motor frame and in contact with both said motor frame and said banding.

4. An electric motor comprising, a tubular motor frame having a stator assembly mounted therein by a heat conductive tubular member which passes through the opening of said stator assembly and is secured at opposite ends to the adjacent motor frame, a rotor rotatably mounted in said motor frame, a cooling means for the end turns of said stator assembly comprising fin-like members having radially projecting tabs inserted between adjacent end turns of said stator assembly and said projecting tabs being in contact with said tubular member.

5. An electric motor comprising, a tubular motor frame having a stator assembly sealed therein by a tubular member which passes through the opening of said stator assembly and is sealed at opposite ends to the adjacent motor frame, a rotor rotatably mounted in said motor frame, a cooling means for the end turns of said stator assembly comprising fin-like members having radial projecting tabs inserted between adjacent end turns of said stator assembly on both the inner and outer surface of said end turns, said projecting tabs on the outer surface having a substantially all metal path of contact with the motor frame and said projecting tabs on the inner surface being in contact with said tubular member.

6. An electric motor comprising, a tubular motor frame having a stator assembly sealed therein by a tubular member which passes through the opening of said stator assembly and is sealed at opposite ends to the adjacent motor frame, a rotor rotatably mounted in said motor frame, a cooling means for the end turns of said stator assembly comprising metallic members inserted between adjacent end turns, tabs projecting from both the inner and outer surface of said end turns and comprising at least in part a solid metallic heat conducting path to said motor frame and said tubular member, respectively.

7. A motor pump unit comprising, a motor casing having a tubular outer frame and a stator assembly sealed therein by means of a tubular member passing through said stator assembly and sealed at opposite ends to said outer frame, said motor casing being attached at one end to a pump casing and closed at the other end, a rotor rotatably mounted in said motor casing and having a shaft extending into said pump casing, a rotary pump impeller mounted on said shaft extension, a cooling system for said motor comprising a coiled heat exchanger surrounding said outer frame and means for circulating the fluid being pumped through said heat exchanger, a cooling means for the end turns of said stator assembly comprising metallic members inserted between at least some of said end turns and extending from both the inner and outer surfaces of said end turns, and at least some of the extensions of said metallic members being in contact with said outer frame.

8. In a dynamoelectric machine having a generally tubular frame, a hollow stator assembly, a rotor mounted for rotation in said stator assembly, and backing rings at opposite ends of the stator assembly for mounting said stator assembly within said frame and defining end turn spaces with said frame; the combination comprising a plurality of heat conductive fin-like members inserted between adjacent end turns of said stator assembly, said members having radially projecting tabs with some of said tabs extending from the outer surface of said end turns and with others of said tabs extending from the inner surface of said end turns, said outer surface tabs being disposed in heat conductive relationship to said frame and said inner surface tabs being disposed in heat conductive relationship to said backing rings.

9. In a dynamoelectric machine having a generally tubular frame, a hollow stator assembly, a rotor assembly mounted for rotation in said stator assembly and heat conductive supporting means engaging opposite ends of said assembly for mounting said stator assembly within said frame; the combination comprising a plurality of fin-like members inserted between adjacent end turns of said stator assembly, a plurality of tabs on said fin-like members and projecting from both the inner and outer surfaces of said end turns and heat conductive means coupling said inner and said outer surface tabs in heat conductive relationship to said supporting means and said frame, respectively.

10. In a dynamoelectric machine having a generally tubular heat conductive frame, a hollow stator assembly mounted within said frame, and a rotor assembly mounted for rotation in said stator assembly; the combination comprising a plurality of heat conductive fin-like members placed between adjacent end turns of said stator assembly, a plurality of tabs projecting from said fin-like members, and means including a heat conductive banding means for holding said members between said end turns and providing a path of low thermal resistance from said tabs to said frame.

11. In a dynamoelectric machine having a generally tubular frame, a hollow stator assembly mounted within said frame, and a rotor assembly mounted for rotation in said stator assembly; the combination comprising a plurality of heat conductive fin-like members placed between adjacent end turns of said stator assembly, a plurality of tabs projecting from said fin-like members, a heat conductive foil surrounding said tabs, and heat conductive means for banding said foil, said heat conductive means being disposed in thermal relationship with said frame.

12. In a dynamoelectric machine having a generally tubular heat conductive frame, a hollow stator assembly disposed within said frame, heat-conductive supporting means for supporting said stator assembly and a rotor assembly mounted for rotation in said stator assembly; the combination comprising a plurality of heat conductive fin-like members inserted between at least some of said end turns and extending from both the inner and outer surfaces thereof, at least some of the extensions of said members being disposed in heat-conductive relation with said frame, and the remainder of said extensions being disposed in heat-conductive relation with said supporting means.

References Cited in the file of this patent

UNITED STATES PATENTS

| | | |
|---|---|---|
| 1,794,029 | Pfleger | Feb. 24, 1931 |
| 1,969,493 | Ansingh | Aug. 7, 1934 |
| 2,401,386 | Smellie | June 4, 1946 |
| 2,460,418 | Hart | Feb. 1, 1946 |

FOREIGN PATENTS

| | | |
|---|---|---|
| 333,616 | Great Britain | Aug. 18, 1930 |
| 588,078 | Germany | Nov. 13, 1933 |